United States Patent [19]

Padwa

[11] Patent Number: 5,082,742
[45] Date of Patent: Jan. 21, 1992

[54] COMPOSITE OF A STYRENIC POLYMER ADHERED TO A POLYOLEFIN

[75] Inventor: Allen R. Padwa, Worcester, Mass.
[73] Assignee: Monsanto Company, St. Louis, Mo.
[21] Appl. No.: 589,805
[22] Filed: Sep. 24, 1990
[51] Int. Cl.$^5$ ............................................. B32B 27/08
[52] U.S. Cl. ................................. 428/515; 428/413; 428/414; 428/516; 428/517; 428/520; 525/64; 525/69; 525/391
[58] Field of Search ............... 428/515, 516, 518, 520, 428/413, 414, 35, 7, 517; 525/384, 385, 386, 391, 64, 69, 166, 71, 108; 264/514

[56] References Cited

U.S. PATENT DOCUMENTS

| | | |
|---|---|---|
| 4,230,761 | 10/1980 | Watts ................................. 428/215 |
| 4,234,653 | 11/1980 | Catte et al. ......................... 428/517 |
| 4,243,725 | 1/1981 | Wiggins et al. ..................... 428/517 |
| 4,339,502 | 7/1982 | Gerry et al. ........................ 428/411 |
| 4,359,506 | 11/1982 | Wggins et al. ..................... 428/412 |
| 4,447,488 | 5/1984 | Simm et al. ........................ 428/213 |
| 4,451,512 | 5/1984 | Yazaki et al. ...................... 428/414 |
| 4,600,648 | 7/1986 | Yazahi et al. ...................... 428/413 |
| 4,647,509 | 3/1987 | Wallace et al. .................... 428/474.9 |
| 4,654,255 | 5/1987 | Kojima et al. ..................... 428/261 |
| 4,656,094 | 4/1987 | Kojima et al. ..................... 428/261 |
| 4,659,785 | 4/1987 | Nagano et al. ..................... 428/516 |
| 4,719,153 | 1/1988 | Akasawa et al. ................... 428/515 |
| 4,792,477 | 12/1988 | Ochiumi ............................ 428/216 |

Primary Examiner—Merrell C. Cashion, Jr.
Assistant Examiner—Hoa Thi Le

[57] ABSTRACT

This invention relates to a composite of a thermoplastic resin (other than a polyolefin) and a polyolefin adhered together by a tie-layer system comprised of at least two co-reactive, functionalized polymers either in laminate contact or as a blend.

22 Claims, No Drawings

COMPOSITE OF A STYRENIC POLYMER ADHERED TO A POLYOLEFIN

BACKGROUND OF THE INVENTION

This invention relates to a composite of a thermoplastic resin (other than a polyolefin) adhered to a polyolefin. In particular, this invention relates to a tie-layer system for adhering a thermoplastic resin to a polyolefin. The tie-layer is comprised of at least two co-reactive, functionalized polymers, either in laminate contact or as a blend.

It is known that most thermoplastic resins are tough, processable by sheet extrusion and thermoforming, but may exhibit only average to poor weatherability. It is also known that polyolefins and rubber-modified polyolefins provide more weather stable surfaces. Lamination or coextrusion of thermoplastic resins (other than polyolefins) and polyolefins result in composites which combine the properties of both polymers and which can provide articles appropriate for applications such as truck-bed and refrigerator liners. Yet, manufacture of such composites has not been possible due to the fact that these polymers are incompatible and exhibit poor interfacial adhesion.

It is therefore an object of the present invention to provide a tie-layer system to effect adhesion between thermoplastic resins and polyolefins.

It is a further object of the present invention to provide a composite comprising a thermoplastic resin layer and a polyolefin layer with a dual or single tie-layer system disposed between them.

SUMMARY OF THE PRESENT INVENTION

The present invention provides for a four-layer composite comprising the following layers in laminate contact with each other:

I. a layer of a thermoplastic resin;
II. a tie-layer of a functionalized thermoplastic resin;
III. a tie-layer of a functionalized polyolefin; and
IV. a layer of a polyolefin.

The thermoplastic resin and polyolefin of tie-layers II and III are selected so as to be compatible with and capable of adhering to layers I and IV respectively and are functionalized so as to effect adhesion between the tie-layers The present invention also provides for a three-layer composite comprising the following layers in laminate contact with each other:

I. a layer of a thermoplastic resin;
II. a tie-layer which is a polyblend comprised of a functionalized thermoplastic resin and a functionalized polyolefin; and
III. a layer of a polyolefin.

DETAILED DESCRIPTION OF THE PREFERRED EMBODIMENTS

The thermoplastic resins used in the present invention include styrenic polymers, polyvinylchlorides, polycarbonates, and polymers containing esters of olefinically unsaturated carboxylic acids.

The styrenic polymers include polystyrene, styrene acrylonitrile copolymers (SAN), acrylonitrile-butadiene-styrene copolymers (ABS), acrylonitrile-styrene-acrylate copolymers (ASA), methacrylate-butadiene-styrene copolymers (MBS), and styrene-methyl methacrylate copolymers (S/MMA).

The polymers containing esters of olefinically unsaturated carboxylic acids include homopolymers such as poly(methyl acrylate), poly(ethyl acrylate), the poly(propyl acrylates), the poly(butyl acrylates), the poly(amyl acrylates), the poly(hexyl acrylates), poly(methyl methacrylate), poly(ethyl methacrylate), the poly(propyl methacrylates), the poly(butyl methacrylates), the poly(amyl methacrylates), the poly(hexyl methacrylates) and the like; and copolymers of the above (meth)acrylates with one or more copolymerizable monomers.

The preferred thermoplastic resin for the outer composite layer is ABS.

Preferred thermoplastic resins for the tie-layer are SAN, ABS and ASA.

The polyolefins used in the present invention include $C_2$ to $C_6$ olefinic homopolymers and copolymers such as polyethylene, polypropylene and polybutylene homopolymers, ethylene propylene copolymers and rubber-modified olefinic homopolymers and copolymers including ethylene-propylene-diene-monomer(EPDM)-modified polypropylene.

Preferred polyolefins for the outer composite layer are polypropylene homopolymer and ethylene-propylene-diene-monomer(EPDM)-modified polypropylene.

The preferred polyolefin for the tie-layer is polypropylene homopolymer.

The thermoplastic resins of the outer composite layer and the adjacent tie-layer are selected so as to be compatible with each other. The polyolefins are selected in accordance with the same objective. The term "compatible" as used herein means to be capable of adhering to a contiguous layer.

The functional group of the functionalized thermoplastic resin of the present invention is an epoxy functional group, present in an amount of about 0.10% to about 10% by weight and selected from the group including glycidyl (alkyl)acrylate, allyl glycidyl ethers, vinyl glycidyl ethers and glycidyl itaconates. The preferred epoxy functional group is glycidyl methacrylate It is noted that all percent functionalization values listed herein are bound values unless otherwise specified.

The preferred epoxy functional thermoplastic polymers of the present invention are glycidyl methacrylate functionalized SAN, ABS and ASA copolymers containing from about 0.50% to about 6.0% by weight of glycidyl methacrylate.

The functional group of the functionalized polyolefin of the present invention is selected from the group consisting of unsaturated compounds containing a group capable of reacting with an epoxy group at processing temperatures. This group includes acid and anhydride functional groups present in amounts of about 0.10% to about 10% by weight for the dual tie-layer system and from about 0.10% to about 3.0% by weight for the single tie-layer system. The term "processing temperatures" as used herein relates to lamination or co-extrusion temperatures appropriate for the thermoplastic resin and polyolefin being processed.

The acid functional group is selected from the group including $\alpha,\beta$-unsaturated carbonyl compounds such as acrylic, methacrylic, crotonic and cinnamic acids and vinyl benzoic acid. The preferred acid is acrylic acid because of its higher reactivity to grafting onto the olefinic backbone.

The anhydride functional group of the present invention includes itaconic anhydride, methyl maleic anhydride, maleic anhydride and the like. The preferred anhydride is maleic anhydride.

In order to promote adhesion between the anhydride and epoxy layers, the use of a catalyst to promote reaction is desirable. It has been found that at least 0.3% by weight, based on the total weight of the tie-layer blend, of magnesium stearate is effective in promoting a reaction sufficient to allow formation of an adequate tie-layer material.

The preferred functionalized polyolefin of the present invention is an acid functionalized polyolefin containing from about 0.50% to about 6.0% by weight of acid for the dual tie-layer system and from about 0.10% to about 2.0% by weight of acid for the single tie-layer system. The preferred acid functionalized polyolefin is acrylic acid functionalized polypropylene.

The preferred four-layer composite of the present invention is comprised of:

I. a layer of acrylonitrile-butadiene-styrene copolymer, which is laminated to;

II. a tie-layer of glycidyl methacrylate functionalized styrene acrylonitrile copolymer containing about 0.50% to about 6.0% by weight of glycidyl methacrylate, which is laminated to;

III. a tie-layer of acrylic acid functionalized polypropylene containing from about 0.5% to about 6.0% of acrylic acid, which is laminated to;

IV. a layer of polypropylene or rubber-modified polypropylene.

The single tie-layer system of the present invention is comprised of from about 50% to about 70% by weight of an epoxy functionalized thermoplastic polymer containing from about 0.10% to about 10% by weight of epoxy functionalization, and from about 50% to about 30% by weight of an acid functionalized polyolefin containing from about 0.10% to about 3.0% by weight of acid functionalization.

The tie-layer components can be mixed by any of the generally known methods such as a melt mixing method in which a roll kneader, a Banbury Kneader, a screw extruder or the like is used.

It has been found that it is necessary in the single tie-layer system to have a properly controlled level of functionality and to have a proper ratio of components in order to achieve adhesion of the tie-layer to both the thermoplastic resin and the polyolefin.

The preferred three-layer composite of the present invention is comprised of:

A. a layer of acrylonitrile-butadiene-styrene copolymer, which is laminated to;

B. a tie-layer which is a polyblend comprised of from about 60% to about 70% by weight of glycidyl methacrylate functionalized styrene acrylonitrile copolymer containing about 0.50% to about 6.0% by weight of glycidyl methacrylate, and from about 40% to about 30% by weight of acrylic acid functionalized polypropylene containing from about 0.10% to about 2.0% by weight of acrylic acid; wherein the sum of the polyblend components is 100% by weight, which is laminated to;

C. a layer of polypropylene or rubber-modified polypropylene.

The composites of the present invention are preferably used in conjunction with a co-extrusion process. Specifically, two materials are made to adhere to one another during shaping while in the molten phase. In this process, the composite components are fed into extruder hoppers, melted and then extruded in melt streams to form the laminated structure by means of a co-extrusion adapter and die in a one-step, in-line manufacturing operation. This allows the components to flow together to form the desired multi-layer structure.

The molten layers can be processed within a temperature range of 200° to 275° C.

The present invention is described in more detail with reference to the following Examples which are for purposes of illustration only and are not to be understood as indicating or implying any limitations on the broad invention described herein.

WORKING EXAMPLES

Components Used

ABS-1—extrusion grade containing about 20% rubber and 30% AN. Available from Monsanto Co. as Lustran ® 841.

ABS-2—molding grade containing about 13% rubber and 23% AN. Available from Monsanto Co. as Lustran ® Elite LGA.

PP—polypropylene homopolymer. (Melt Index=0.8) Available from Himont Co. as Profax 6723.

RMPP—rubber-modified PP. Available from Monsanto Co. as Santoprene ® 223 Thermoplastic Elastomer.

SAN-1—a copolymer of styrene and acrylonitrile containing 68% by weight based on the weight of the copolymer of styrene an 32% by weight based on the weight of the copolymer of acrylonitrile. Available from Monsanto Co. as Lustran ® SAN-33.

SAN-2—a copolymer of styrene and acrylonitrile containing 77% by weight based on the weight of the copolymer of styrene and 23% by weight based on the weight of the copolymer of acrylonitrile. Available from Monsanto Co. as Lustran ® SAN-31.

SANGMA-(28/1.50)—terpolymer of styrene, acrylonitrile, and glycidyl methacrylate containing 28%AN and 1.50% GMA.

SANGMA-(23/1.50)—terpolymer of styrene, acrylonitrile, and glycidyl methacrylate containing 23% AN and 1.50% GMA.

SANGMA-(21/1.50)—terpolymer of styrene, acrylonitrile, and glycidyl methacrylate containing 21% AN and 1.50% GMA.

PPgAA-6—6% acrylic acid grafted polypropylene copolymer. Available from BP Performance Polymers as Polybond 1016.

PPgAA-2—2% acrylic acid grafted polypropylene copolymer. Available from BP Performance Polymers as Polybond Melt Index 30.

PMA-2—2.0% (as charged) maleic anhydride modified polypropylene.

PPgCrA-2.0—2.0% (as charged) crotonic acid grafted polypropylene.

PPgCiA-2.0—2.0% (as charged) cinnamic acid grafted polypropylene.

PPgCrA-0.34—0.34% (as charged) crotonic acid grafted polypropylene.

PPgCrA-1.4—1.4% (as charged) crotonic acid grafted polypropylene.

PPgCrA-2.1—2.1% (as charged) crotonic acid grafted polypropylene.

Sample Preparation

Sheets of ABS-1, ABS-2, PP and RMPP, having dimensions of 76×102×2.54mm, were formed in an Arburg Injection Molding machine (Model No. 221-75-350) under the following conditions:

| Barrel Temperature (°C.) | ABS | PP | RMPP |
|---|---|---|---|
| Zone | | | |
| 1 | 248 | 200 | 248 |
| 2 | 250 | 200 | 250 |
| 3 | 251 | 200 | 251 |
| Nozzle | 252 | 195 | 252 |
| Mold Temperature (°C.) | 66 | 38 | 42 |
| Injection Time (sec) | 4.0 | 4.0 | 1.5 |

SANGMA was prepared by solution polymerization of styrene, acrylonitrile, and glycidyl methacrylate in methyl ethyl ketone at 145° C. followed by devolatilization at 220° C. and 3.33 kPa.

PPMA-2 was prepared according to the procedure set forth in U.S. Pat. No. 4,299,931, Column lines 12 to 37.

PPgCrA-2.0 and PPgCiA-2.0 were prepared according to Graft Method A where a mixture of PP containing 2.0 weight % of either Cinnamic or Crotonic acid and 0.5% 2,5-di-(t-butylperoxy)-2,5-dimethyl hexane (DBPH) was fed at a rate of 7.45 g/min. into a Brabender Plastograph equipped with a twin screw mixer operating at 180° C. and 20 RPM.

PPgCrA-0.34, PPgCrA-1.4 and PPgCrA-2.1 were prepared according to Graft Method B where 226 grams of PP were added to a Brabender plastograph fitted with a 300 cm³ electrically heated mixing chamber with plasticating paddles at 180° C. The unsaturated acid was added with the mixer set at 15 RPM. 1% by weight of DBPH was added and the RPM increased to 50. After 5 minutes, the polymer was removed and cooled under ambient conditions.

Films of epoxy functionalized SAN and anhydride and acid functionalized PP polymers were prepared by compression molding each polymer into 0.1 mm thick films in a press at 204° C. between sheets of Teflon coated aluminum foil (Trifoil No. 303 from Tri-point Industries) for 1 minute at 0.28 GPa. The resulting films were cooled by running the foil under cold tap water. Care was taken not to touch the films.

The single tie-layer films were prepared by pre-reacting the functional polymers in a Brabender mixer at 200° C. and 75 RPM. The mixtures were then pressed into films as described above.

Compression Molding Method For Composites

The prepared layers were placed in a compression mold (76×102×5.21 mm) in the following orders:
2.54 mm thick sheet of ABS-1 or ABS-2.
0.1 mm thick film of functionalized SAN.
0.1 mm thick film of functionalized PP.
2.54 mm thick sheet of RMPP or PP. or
2.54 mm thick sheet of ABS-1 or ABS-2.
0.1 mm thick film of pre-reacted functionalized SAN and functionalized PP.
2.54 mm thick sheet of RMPP or PP.

The layers were pressed at 218° C. or 232° C. and 0.28 GPa for specified periods of time and cooled under pressure. Lamination times were dependent on the level and reactivity of the functional groups of the tie-layer components.

The resulting laminated plaques were then cut into 12.7×76 mm bars and double notched with a hacksaw to form a 12.7×6.35 mm lap shear joint. Each bar was then tested for shear strength.

Test Methods

SHEAR STRENGTH (MPa)—Each bar was pulled in an Instron Tensile Tester (Model No. 1123) at 5 mm/min per ASTM #D638.

Shear strength was calculated as the load at break divided by the lamination area. Results are given in MegaPascals.

EXAMPLES 1 TO 5

In Examples 1 through 5 dual tie-layer systems, i.e., two layers of co-reactive, functionalized polymers in laminated contact with each other, interposed between an ABS layer and a polyolefin layer, are tested. In Example 1, a non-functionalized SAN tie-layer is used for control purposes. The acid functionalized polyolefin used in each example is PPgAA-6. The lamination results are tabulated in Table I.

TABLE I

SUMMARY OF EXAMPLES 1 TO 5

| EXAMPLE NO. | ABS | SAN | POLYOLEFIN | LAMINATION TIME (MIN.) | SHEAR STRENGTH (MPa) |
|---|---|---|---|---|---|
| 1 | ABS-2 | SAN-2 (23% AN) | PP | 4 | 0 |
| 2 | ABS-1 | SANGMA (28% AN/1.50% GMA) | RMPP | 5 | 4.0 |
| 3 | ABS-1 | SANGMA (21% AN/1.50% GMA) | RMPP | 5 | 4.2 |
| 4 | ABS-1 | SANGMA (28% AN/1.50% GMA) | PP | 5 | 4.2 |
| 5 | ABS-2 | SANGMA (23% AN/1.50% GMA) | PP | 5 | 4.6 |

NOTE: Laminations at 218° C.

Example 1 delaminated upon removal from the mold and was considered to have a shear strength of 0.

Examples 2 through 5 show effective dual tie-layer systems utilizing tie-layers of epoxy-functional SAN and acrylic acid functional polypropylene. These examples demonstrate that varying the amount of AN to the degree shown has a negligible effect in terms of adhesion In addition, the adhesive strengths of the epoxy-functional SAN tie-layer to either rubber-modified polypropylene (RMPP) or polypropylene homopolymer (PP) are quite similar. This result indicates that other rubber-modified polyolefins should work equally well.

EXAMPLES 6 TO 12

In Examples 6 to 12, the effect of diluting the SAN tie-layer and/or the PP tie-layer upon the formation of adhesive bonds was determined. This is equivalent to reducing the amount of functionalization. The SAN tie-layer and/or the PP tie-layer were diluted with ABS-2 or SAN-1 and PP respectively. All examples use ABS-1 and RMPP as the outer layers. The results are tabulated in Table II.

tionalized polyolefin tie-layer were tested. The percent acid functionalization values are reported as the percent by weight of acid charged to the reaction vessel. All

TABLE II

SUMMARY OF EXAMPLES 6 TO 12

| EXAMPLE NO. | COMPOSITION OF SAN tie-layer | COMPOSITION OF PP tie-layer | LAMINATION TIME (MIN.) | SHEAR STRENGTH (MPa) |
|---|---|---|---|---|
| 6 | SANGMA (28% AN/1.50% GMA) | PPgAA-6 | 4 | 4.0 |
| 7 | SANGMA (21% AN/1.50% GMA) | PPgAA-6 | 4 | 4.2 |
| 8 | SANGMA (28% AN/1.50% GMA) | 20% PPgAA-6 80% PP | 15 | 3.7 |
| 9 | 70% SANGMA (23% AN/1.50% GMA) 30% SAN-1 | PPgAA-6 | 5 | 3.1 |
| 10 | 70% SANGMA (28% AN/1.50% GMA) 30% ABS-2 | PPgAA-6 | 5 | 2.1 |
| 11 | 70% SANGMA (28% AN/1.50% GMA) 30% SAN-1 | 20% PPgAA-6 80% PP | 5 | 0 |
| 12 | 70% SANGMA (28% AN/1.50% GMA) 30% SAN-1 | PPgAA-2 | 5 | 2.5 |

NOTE: Laminations at 218° C.

Examples 6 and 7 re-demonstrate that varying the amount of AN in the epoxy-functionalized SAN tie-layer to the degree shown has a negligible effect in terms of adhesion.

Examples 8 to 10 show that dilution of the SANGMA tie-layer or the PPgAA-6 tie-layer with SAN-1 or ABS-2 and PP respectively, still provides a laminated composite. In addition, the reduction in the functionality level does not result in any significant reduction in the rates of reaction Example 11 indicates that dilution of both tie-layer components to the degree shown interferes with the bonding ability of the tie-layer thereby necessitating longer lamination times. Example 12, which utilized PPgAA-2 with an acid level of 2%, gave a satisfactory product.

EXAMPLES 13 TO 17

In Examples 13 through 17 dual tie-layer systems utilizing either PPgCiA or PPgCrA as the acid func- tionalized polyolefin tie-layer were tested. examples use ABS-1 and RMPP as the outer layers and use SANGMA (28/1.50) as the SAN tie-layer. The results are tabulated in Table III.

TABLE III

SUMMARY OF EXAMPLES 13 TO 17

| EXAMPLE NO. | ACID FUNCTIONALIZED POLYPROPYLENE | GRAFT METHOD[1] | LAMINATION TIME (MIN.) | SHEAR STRENGTH (MPa) |
|---|---|---|---|---|
| 13 | PPgCrA-2.0 | A | 15 | 4.2 |
| 14 | PPgCiA-2.0 | A | 15 | 4.6 |
| 15 | PPgCrA-2.1 | B | 30 | 1.9 |
| 16 | PPgCrA-1.4 | B | 15 | 2.2 |
| 17 | PPgCrA-0.34 | B | 30 | 0 |

[1] A = Grafted in Brabender Twin Screw Mixer.
B = Grafted in Brabender Plastograph.
NOTE: Laminations at 218° C.

Examples 13 through 17 demonstrate that even slowly reacting unsaturated acids result in adhesion at all but the lowest levels tested. In addition, Graft Method A results in an acid functionalized PP tie-layer with a higher degree of reactivity toward epoxy demonstrated by the higher shear strength values obtained.

EXAMPLES 18 TO 28

In Examples 18 through 28 blends of epoxy-functionalized SAN and acid or anhydride functionalized PP were pre-reacted, pressed into a film and evaluated as a single tie-layer. In each example ABS-1 and RMPP are used as the outer layers. The results are tabulated in Table IV.

TABLE IV

SUMMARY OF EXAMPLES 18 TO 28

| EXAMPLE NO. | POLYMER | TEMP. (°C.) | LAMINATION TIME (Min.) | SHEAR STRENGTH (MPa) |
|---|---|---|---|---|
| 18* | SANGMA/PPMA-2 35/65 | 232. | 10. | 0 |
| 19* | SANGMA/PPMA-2 50/50 | 232. | 10. | 0 |
| 20* | SANGMA/PPMA-2 65/35 | 232. | 10. | 0.7 |
| 21 | SANGMA/PPgAA-6 35/65 | 218. | 15. | 0 |
| 22 | SANGMA/PPgAA-6 50/50 | 218. | 15. | 0 |
| 23 | SANGMA/PPgAA-6 65/35 | 218. | 30. | 0 |
| 24 | SANGMA/PPgAA-2 | 218. | 15. | 0 |

TABLE IV-continued

SUMMARY OF EXAMPLES 18 TO 28

| EXAMPLE NO. | POLYMER | TEMP. (°C.) | LAMINATION TIME (Min.) | SHEAR STRENGTH (MPa) |
|---|---|---|---|---|
| 25 | 50/50 SANGMA/PPgAA-6 | 218. | 5. | 4.0 |
| 26 | 65/35 SANGMA/PPgCrA-0.34 | 218. | 5. | 1.7 |
| 27 | 65/35 SANGMA/PPgCrA-1.4 | 218. | 5. | 2.3 |
| 28 | 65/35 SANGMA/PPgCrA-2.1 65/35 | 218. | 5. | 2.7 |

*Contains 0.3% magnesium stearate as reaction catalyst.

The effective single-tie layer systems generally displayed lower shear strength values as compared to the dual-tie layer systems tested. A few single-tie layer systems showed comparable adhesion.

The anhydride/epoxy systems in Examples 18, 19 and 20 utilized 0.3% magnesium stearate as a reaction catalyst. Example 20 shows by the shear strength value obtained that when the tie-layer components are present in a ratio of 65% SANGMA and 35% PPMA-2 the resulting epoxy/anhydride system is sufficient to form a tie-layer material. In Examples 18 and 19, no bond was obtained where the SANGMA and PPMA-2 tie-layer components were not present at the 65/35 ratio.

The epoxy/acid systems tested are set forth in Examples 21 to 28.

Examples 21 to 23 demonstrate that with tie-layers made from SANGMA and PPgAA-6 no adhesion occurs. This is most likely due to a large amount of branching occurring with the two highly functional polymers. In Examples 24 and 25 where the acid content is reduced to 2% adhesion begins to occur at approximately the 65/35 weight ratio of components. The ratio of 65% SAN/35% PP appears desirable in all the systems tested for proper phase relationships in the tie-layer.

In Examples 26, 27 and 28 where the functionality is further reduced, via crotonic acid grafts, the grafts produced all acted as tie-layers. As the level of crotonic acid graft increased (in the order of Examples 26 to 28) the adhesion also increased. It is further noted that the % acid functionalization values listed for the crotonic acid grafts are reported as the percent acid charged to the reaction vessel. The bound values are noteably less.

It is, therefore, desirable to have a properly controlled level of reactivity/functionality in the polymers and to have the proper ratio of components in the graft to achieve adhesion of the graft to both the thermoplastic resin and the polyolefin.

Having thus described the invention what is claimed is:

1. A tie-layer system suitable for combining a styrenic polymer and a polyolefin which is comprised of at least two co-reactive, functionalized polymers either in laminate contact or as a blend; the first such polymer being
   (a) an epoxy functionalized styrenic polymer wherein said epoxy functional group is selected from the group consisting of glycidyl (alkyl) acrylate, allyl glycidyl ethers, vinyl glycidyl ethers and glycidyl itaconates; and the second such polymer being
   (b) an acid functionalized polyolefin wherein said acid functional group is selected from the group consisting of acrylic, methyacrylic, vinyl benzoic, crotonic and cinnamic acids.

2. The tie-layer system of claim 1 which is a dual tie-layer comprised of a layer of polymer (a) in laminate contact with a layer of polymer (b); wherein the functional groups of polymer (a) and polymer (b) are both presenting an amount of 0.10% to about 10% by weight.

3. The tie-layer system of claim 1 which is a single tie-layer consisting of a polyblend comprised of from about 50% to about 70% by weight of polymer (a) and from about 50% to about 30% by weight of polymer (b); wherein the epoxy functional group of polymer (a) is present in an amount of about 0.10% to about 10% by weight; the acid functional group of polymer (b) is present in an amount of about 0.10% to about 3.0% by weight; and wherein the sum of the polyblend components is 100% by weight.

4. The tie-layer system of claims 1, 2, or 3 wherein the styrenic polymer is selected from the group consisting of polystyrene, styrene acrylonitrile copolymers, acrylonitrile-butadiene-styrene copolymers, acrylonitrile-styrene-acrylate copolymers, methacrylate-butadiene-styrene copolymers, and styrene-methyl methacrylate copolymers; and wherein the polyolefin is selected from the group consisting of $C_2$ to $C_6$ olefinic homopolymers and copolymers including polyethylene, polypropylene and polybutylene homopolymers, ethylene-propylene copolymers and rubber-modified homopolymers and copolymers including ethylene-propylene-diene-monomer (EPDM)-modified polypropylene.

5. The tie-layer system of claim 4 which is a dual tie-layer comprised of the following layers in laminate contact:
   (a) glycidyl methacrylate functionalized styrene acrylonitrile copolymer containing about 0.5% to about 6.0% by weight of glycidyl methacrylate, which is laminated to:
   (b) acrylic acid functionalized polypropylene containing about 0.5% to about 6.0% by weight of acrylic acid.

6. The tie-layer system of claim 4 which is a dual tie-layer comprised of the following layers in laminate contact:
   (a) glycidyl methacrylate functionalized acrylonitrile-butadiene-styrene copolymer containing about 0.5% to about 6.0% by weight of glycidyl methacrylate, which is laminated to:
   (b) acrylic acid functionalized polypropylene containing about 0.5% to about 6.0% by weight of acrylic acid.

7. The tie-layer system of claim 4 which is a dual tie-layer comprised of the following layers in laminate contact:

(a) glycidyl methacrylate functionalized acrylonitrile-styrene-acrylate copolymer containing about 0.5% to about 6.0% by weight of glycidyl methacrylate, which is laminated to:

(b) acrylic acid functionalized polypropylene containing about 0.5% to about 6.0% by weight of acrylic acid.

8. The tie-layer system of claim 4 which is a single tie-layer consisting of a polyblend comprised of from about 60% to about 70% by weight of glycidyl methacrylate functionalized styrene-acrylonitrile copolymer containing about 0.5% to about 6.0% by weight of glycidyl methacrylate; and from about 40% to about 30% by weight of acrylic acid functionalized polypropylene containing about 0.10% to about 2.0% by weight of acrylic acid; wherein the sum of the polyblend components is 100% by weight.

9. The tie-layer system of claim 4 which is a single tie-layer consisting of a polyblend comprised of from about 60% to about 70% by weight of glycidyl methacrylate functionalized acrylonitrile-butadiene-styrene copolymer containing about 0.5% to about 6.0% by weight of glycidyl methacrylate; and from about 40% to about 30% by weight of acrylic acid functionalized polypropylene containing about 0.10% to about 2.0% by weight of acrylic acid, wherein the sum of the polyblend components is 100% by weight.

10. The tie-layer system of claim 4 which is a single tie-layer consisting of a polyblend comprised of from about 60% to about 70% by weight of glycidyl methacrylate functionalized acrylonitrile-styrene-acrylate copolymer containing about 0.5% to about 6.0% by weight of glycidyl methacrylate; and from about 40% to about 30% by weight of acrylic acid functionalized polypropylene containing about 0.10% to about 2.0% by weight of acrylic acid; wherein the sum the polyblend components is 100% by weight.

11. A composite comprising the following layers in laminate contact with each other:

I. a layer of a styrenic polymer, which is laminated to:

II. a layer of an epoxy functionalized styrenic polymer containing from about 0.10% to about 10% by weight of epoxy functionalization selected from the group consisting of glycidyl (alkyl) acrylate, allyl glycidyl ethers, vinyl glycidyl ethers and glycidyl itaconates; which is laminated to:

III. a layer of an acid functinalized polyolefin containing from about 0.10% to about 10% by weight of acid functionalization selected from the group consisting of acrylic, methacrylic, vinyl benzoic, crotonic and cinnamic acids; which is laminated to:

IV. a layer of polyolefin;

wherein said polyolefin is selected from the group consisting of $C_2$ and $C_6$ olefinic homopolymers and copolymers including polyethylen, polypropylene and polybutylene homopolymers, ethylene-propylene copolymers and rubber modified homopolymers and copolymers including ethylen-propylene-diene-monomer(EPDM)-modified polypropylene; and wherein the styrenic polymer and polyolefin of layers II and III are selected so as to be compatible with layers I and IV respectively and functionalized so as to provide reactive adhesive between layers II and III.

12. The composite of claim 11 wherein the styrenic polymers of layers I and II are selected from the goru pconsisting of polystyrene, styrene acrylonitrile copolymers, acrylonitrile-butadiene-styrene copolymers, acrylonitrile-styrene-acrylate copolymers, methacrylate-butadiene-styrene copolymers and styrene-methyl methacrylate copolymers.

13. The composite of claim 12 which is compiresed of the following layers in laminated contact with each other:

I. a layer of acrylonitriel-butadiene-styrene copolymer, which is laimated to:

II. a layer of a glycidyl methacrylate functionalized styrenic polymer containing about 0.50% to about 6.0% by weight of glycidyl methacrylate, which is laminated to:

III. a layer of acrylic acid functionalized polypropylene containing about 0.50% to about 6.0% by weight of acid functinalizatin, which is laminated to:

IV. a layer of polypropylene, which is optianlly rubber-modified.

14. The composite of claim 13 wherein the styrenic polymer of layer II is a styrene-acrylonitrile copolymer.

15. The composite of claim 13 wherein the styrenic polymer of layer II is an acrylonitrile-butadiene-styrene copolymer.

16. The composite of claim 13 wherein the styrenic polymer of layer II is an acrylontirile-styrene-acrylate copolymer.

17. A composite comprising the following layers in laminate contact with each other:

I. a layer of a styrenic polymer, which is laminated to:

II. a layer which is a polyblend comprised of from about 50% to about 70% by weight of an epoxy functionalized styrenic polymer containing from about 0.10% to about 10% by weight epoxy functionalization selected from the group consisting of glycidyl acrylate, allyl glycidyl ethers, vinyl glycidyl ethers and glycidyl itaconates; and from about 50% to about 30% by weight of an acid functionalized polyolefin containing from abou t0.10% to about 3.0% by weight of acid functionalization selected from the group consisting of acrylic, methacrylic, vinyl benzoic, crotonic and cinnamic acids; wherein the sum of the polyblend components is 100% by weight, which is laminated to:

III. a layer of polyolefin;

wherein said polyolefin is selected form the gruop consisting of $C_2$ to $C_6$ olefinic homopolymers and copolymers including polyethylene, polypropylen and polybutylene homopolymers, ethylene-propylene copolymers and rubber-modified homopolymers and copolymers including ethylene-propylene-diene-monomer(EPDM)-modified polypropylene; and wherein the styrenic polymer and polyolefin of layer II are selected so as to be compatible with layers I and III and functionalized so as to provide reactive adhesion.

18. The composite of claim 17 wherein the styrenic polymers of layers I and II are selected from the group consisting of polystyrene, styrene acrylonitrile copolymers, acrylonitrile-butadiene-styrene copolymers, acrylontirile-styrene-acrylate copolymers, methacrylate-butadiene-styrene copolymers and styrene-methyl methacrylate copolyemrs.

19. The composite of claim 18 which is comprised of the following layers in laminate contact with each other:

I. a layer of acrylonitrile-butadiene-styrene copolymer, which is laminated to:

II. a layer which is apolyblend comprised of from about 60% to about 70% by weight of a glycidyl methacrylate functionalized styrenic polymer containing form about 0.50% to about 6.0% by weight of glycidyl methacrylate; and from about 40% to about 30% by weight of acrylic acid functionalized polypropylene containing from about 0.10% to about 2.0% by weight of acrylic acid, wherein the sum of the polyblend components is 100% by weight which is laminated to:

III. a layer of polypropylene, which is optionally rubber-modified.

20. The composite of claim 19 wherein the styrenic polymer of layer II is a styrene-acrylonitrile copolymer.

21. The composite of claim 19 wherein the styrenic polymer of layer II is an acrylonitrile-butadiene-styrene copolymer.

22. The composite of claim 19 wherein the styrenic polymer of layer II is an acrylonitrile-styrene-acrylate copolymer.

* * * * *

UNITED STATES PATENT AND TRADEMARK OFFICE
CERTIFICATE OF CORRECTION

PATENT NO. : 5,082,742

DATED : JANUARY 21, 1992

INVENTOR(S) : ALLEN R. PADWA

Page 1 of 2

It is certified that error appears in the above-identified patent and that said Letters Patent is hereby corrected as shown below:

Column 5, line 18, of the Patent, change "Column" to -- Column 11 --.

Column 5, line 56, of the Patent, change "! minute" to -- 1 minute --.

In Claim 2, Column 10, line 21, of the Patent, change "presenting" to -- present in --.

In Claim 11, Column 11, line 55, of the Patent, change "polyethylen" to -- polyethylene --.

In Claim 12, Column 11, lines 67-68, of the Patent, change "goru pconsisting" to -- group consisting --.

In Claim 13, Column 12, line 5, of the Patent, change "compiresed" to -- comprised --.

In Claim 13, Column 12, line 8, of the Patent, change "acrylonitriel" to -- acrylonitrile --.

In Claim 13, Column 12, line 9, of the Patent, change "laimated" to -- laminated --.

In Claim 13, Column 12, line 16, of the Patent, change "functinalizatn" to -- functionalization --.

In Claim 13, Column 12, line 18 of the Patent, change "optianlly" to -- optionally --.

In Claim 17, Column 12, line 37, of the Patent, change "glycidyl acrylate" to -- glycidyl (alkyl) acrylate --.

In Claim 17, Column 12, line 40, of the Patent, change "abou t0.10%" to -- about 0.10% --.

In Claim 17, Column 12, line 47, of the Patent, change "gruop" to -- group --.

UNITED STATES PATENT AND TRADEMARK OFFICE
CERTIFICATE OF CORRECTION

PATENT NO. : 5,082,742

DATED : JANUARY 21, 1992

INVENTOR(S) : ALLEN R. PADWA

It is certified that error appears in the above-identified patent and that said Letters Patent is hereby corrected as shown below:

In Claim 18, Column 12, line 63, of the Patent, change "acrylontirile" to -- acrylonitrile --.

In Claim 18, Column 12, line 65, of the Patent, change "copolyemrs" to -- copolymers --.

In Claim 19, Column 13, line 4, of the Patent, change "apolyblend" to -- a polyblend --.

In Claim 19, Column 13, line 7, of the Patent, change "form" to -- from --.

Signed and Sealed this

Fifteenth Day of June, 1993

Attest:

MICHAEL K. KIRK

*Attesting Officer*    Acting Commissioner of Patents and Trademarks